United States Patent [19]

Parvin et al.

[11] 4,290,259
[45] Sep. 22, 1981

[54] KNIFE ASSEMBLY FOR STRIPPING AUGER DRUM OF COMBINE HEADER

[76] Inventors: Charles V. Parvin, Rte. 1, Mulkeytown, Ill. 62865; James Harris, Rte. 1, Box 121A, Rutherford, Tenn. 38369

[21] Appl. No.: 127,113

[22] Filed: Mar. 4, 1980

[51] Int. Cl.³ .......................................... A01D 89/00
[52] U.S. Cl. .................................................. 56/364
[58] Field of Search ............... 56/364, 12.1; 198/693, 198/692, 635

[56] References Cited

U.S. PATENT DOCUMENTS 2,391,763  12/1945  Anderson ............................ 56/364
3,021,662  2/1962  Yaniuk ................................. 56/364

Primary Examiner—Jay N. Eskovitz
Attorney, Agent, or Firm—Harrington A. Lackey

[57] ABSTRACT

A knife assembly for mounting in a combine header for cooperation with the radial feed fingers of the central drum portion of a rotary auger in which a plurality of transversely spaced knife bars fixed to a knife frame are pivotally supported upon a mounting frame fixed in relation to the feed opening of the combine header, so that the cutting edges of the knife bars are closely spaced to the central drum portion of the auger and interdigitate with the radial feed fingers of the auger drum portion, in order to cut exceptionally long vegetation, such as stalks or vines, carried by the auger before such vegetation reaches the feed opening to the combine.

The knife assembly further includes adjustable stop means for accurately locating the cutting edges of the knife bars close to the central drum portion of the auger, and a locking means for locking the knife bars in an elevated inoperative position to permit cleaning out the cut vegetation in the central drum portion of the auger.

7 Claims, 5 Drawing Figures

U.S. Patent  Sep. 22, 1981  Sheet 2 of 2  4,290,259
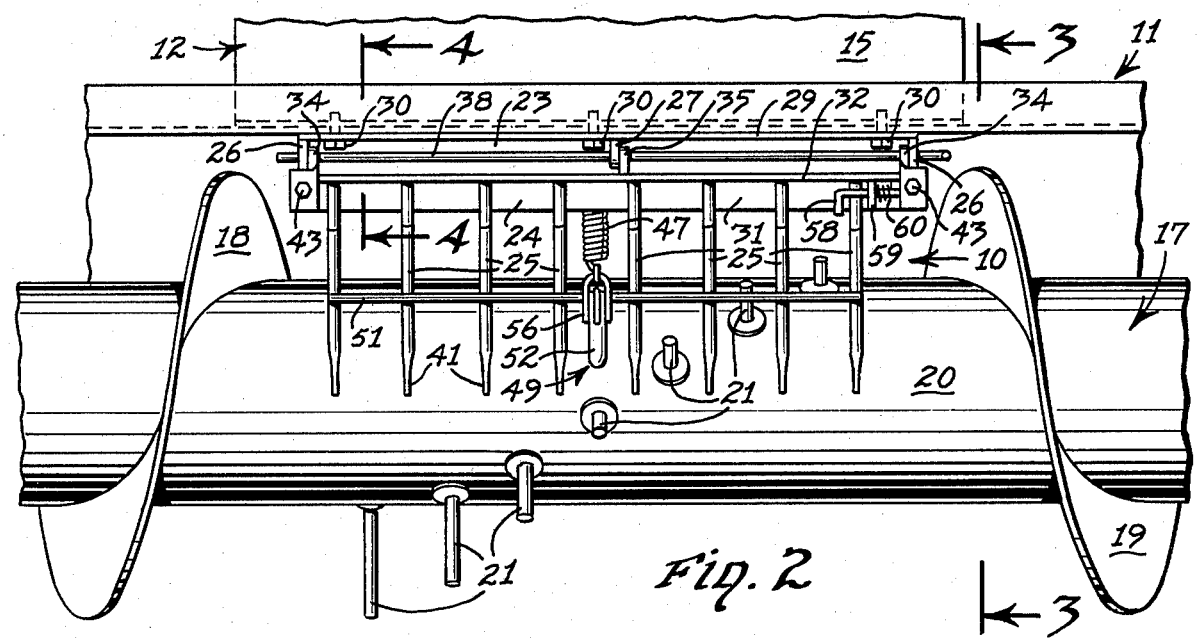
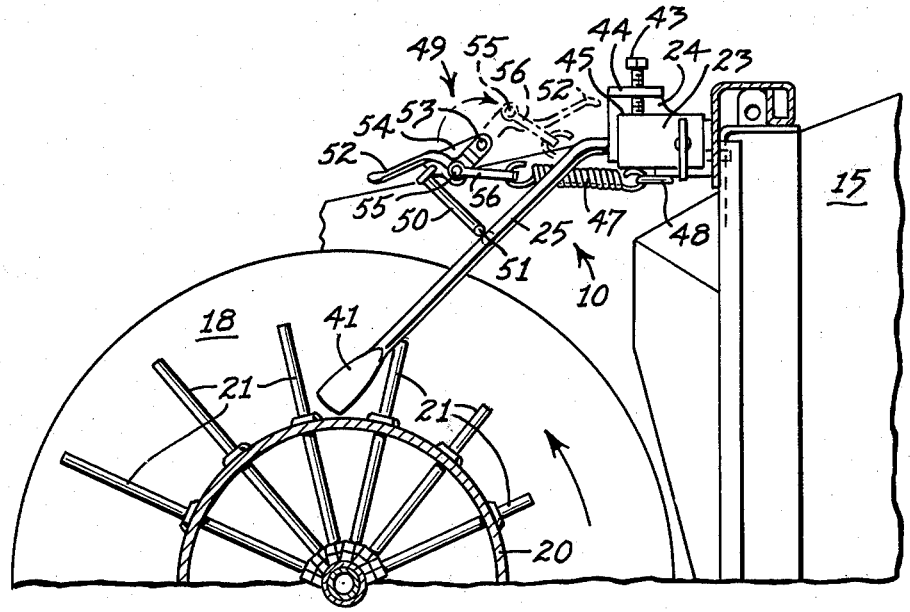
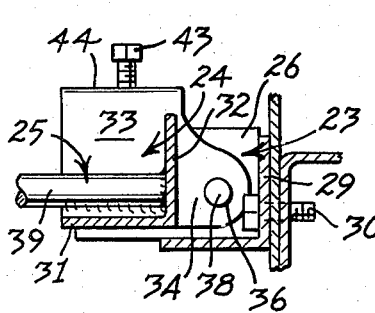
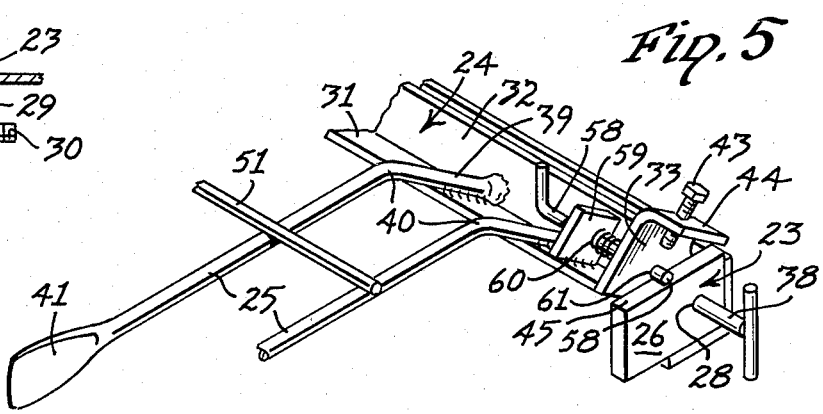

KNIFE ASSEMBLY FOR STRIPPING AUGER DRUM OF COMBINE HEADER

BACKGROUND OF THE INVENTION

This invention relates to combine headers, and more particularly to a cutting apparatus for stripping long vegetation from the central drum portion of the feed auger in a combine header.

The accumulation of vines, long stalks and other undesirable vegetation about the radial spikes on the central drum portion of a rotary auger in a combine header is a consistent problem for farmers operating agricultural combines.

Several attempts have been made to overcome this problem by stripping or cutting the vines, stalks, and other unwanted vegetation from the radial spikes and the central portion of the auger. Some of these stripper devices are disclosed in the following U.S. Pat. Nos. 2,778,483 Nikkel Jan. 22, 1957, 3,021,662 Yaniuk Feb. 20, 1962, 3,525,204 Dovichak Aug. 25, 1970.

Dovichak discloses a stripper bar for stripping vegetation from the helical blades of the auger.

Nikkel discloses a guard plate having slots through which the radial feed fingers pass in order to strip the vegetation from the fingers.

Yaniuk discloses a plurality of cutter bars extending between adjacent feed fingers on the central drum portion of the auger for cutting the vegetation carried by the feed fingers past the cutter bars. The Yaniuk cutter bars are mounted behind the auger and above the feed opening, but the cutter elements are separate from and fixed to the sides of the cutter bars, thereby taking up unnecessary space between the closely spaced feed fingers 11. Moreover, the cutter bars of Yaniuk are mounted in a rigid position relative to the feed opening and the auger.

SUMMARY OF THE INVENTION

It is therefore an object of this invention to provide a knife assembly for stripping unwanted vegetation from the radial feed fingers of the central drum portion of a feed auger in a combine header, in which the knife bars are pivotally mounted relative to the combine header for more versatile operation.

The knife bars of the knife assembly or cutting apparatus, made in accordance with this invention, are fixed to a knife frame so that the knife bars are uniformly spaced to lie between the adjacent radial rotary planes of the feed fingers on the central drum portion of the auger. The cutting end portions of the knife bars are co-linear with the knife bars, so that each knife bar occupies a minimal amount of space between the feed fingers.

The knife frame is journaled upon a mounting frame fixed to the combine header above the feed opening communicating with the throat of the combine. Stop elements on the mounting frame and the knife frame cooperate to limit the pivotal movement of the knife bars toward the central drum portion of the auger. These stop elements are preferably adjustable so that the cutting edges of the knife bars may be precisely located in operative position very close to the outer surface of the central drum portion, so that the cutting edges will not touch the drum portion, yet will cut and strip away unwanted vegetation wrapped around the auger drum surface.

A releasable spring member connected to the mounting frame biases the knife bars toward their operative positions spaced adjacent the auger. Although the strength of the spring member is such as to maintain the knife bars in their operative positions for normal cutting operations, nevertheless if an excessive load or force is exerted against the knife bars by a surge of vegetation or hard material carried by the drum portion, the spring member will yield sufficiently to permit the knife bars to rise thereby preventing damage to the auger, the radial feed fingers, and the knife assembly.

The spring member is preferably provided with a releasable means, such as a connecting toggle member, to relieve the tension in the spring, so that the knife bars can be pivoted to an elevated inoperative position when the combine header is not being used, and to permit clearing the cut vegetation from the central drum area. To this end the cutting assembly preferably includes a spring biased locking pin for holding the cutting frame and cutting bars in their elevated inoperative position relative to the mounting frame.

BRIEF DESCRIPTION OF THE DRAWINGS

FIG. 2 is a fragmentary, top plan view of the knife assembly mounted on the combine header in cooperation with the central drum portion of the feed auger;

FIG. 3 is a fragmentary section taken along the line 3—3 of FIG. 2;

FIG. 4 is an enlarged fragmentary section taken along the line 4—4 of FIG. 2; and FIG. 5 is a fragmentary perspective end view of the locking mechanism for holding the knife frame in an elevated inoperative position relative to the mounting frame.

DESCRIPTION OF THE PREFERRED EMBODIMENTS

Figure 1:
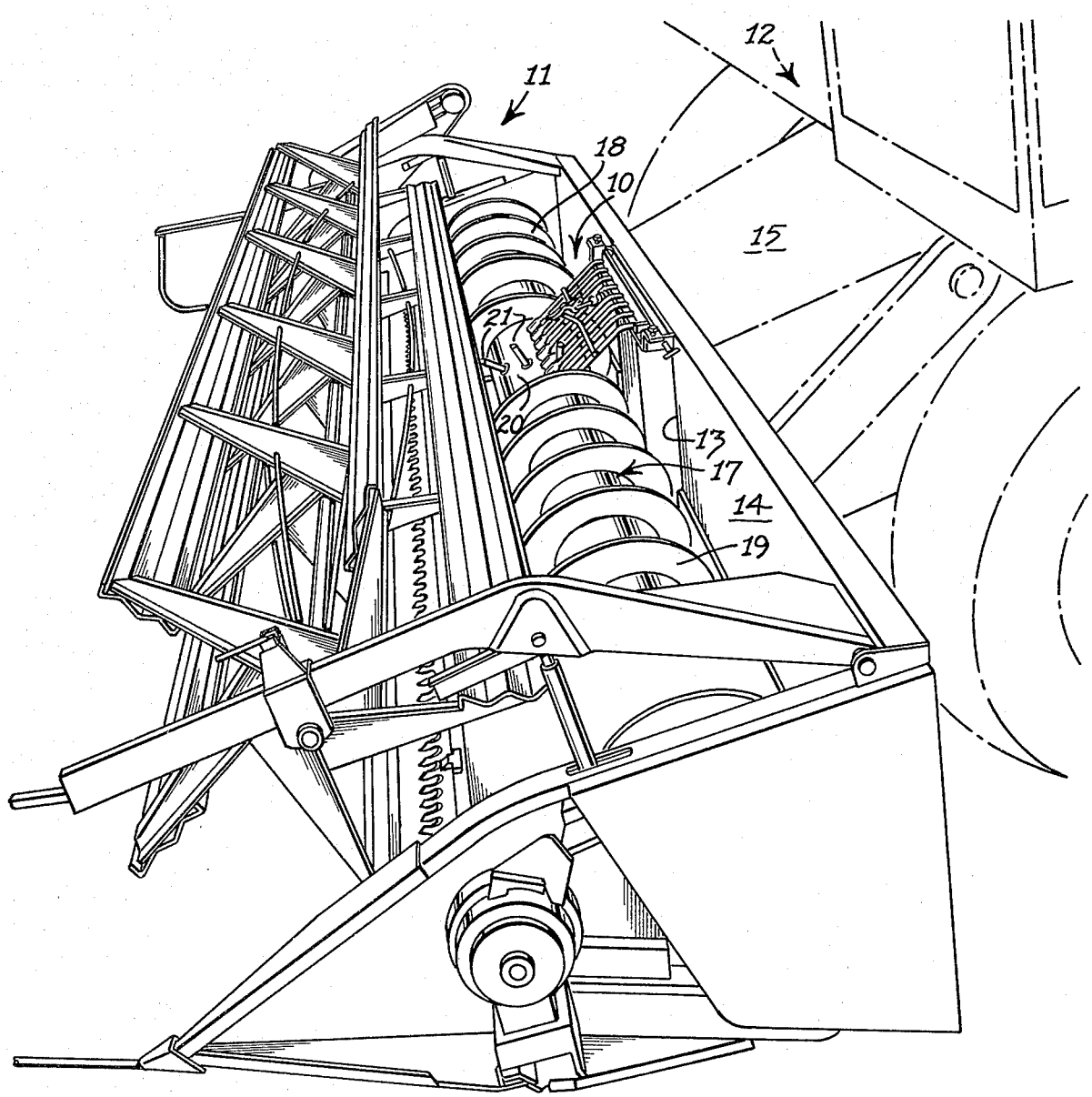
FIG. 1 is a side perspective view of a combine header mounted on a combine, shown in phantom, with the knife assembly mounted in operative position.

Referring now to the drawings in more detail, FIG. 1 discloses the knife assembly or cutter apparatus 10, made in accordance with this invention, mounted upon one type of combine header 11 supported upon a combine header 12, shown in phantom.

The combine header 11 has a feed opening 13 in its rear wall 14 communicating with the throat 15 of the combine 12.

Spaced in front of the back wall 14 of the header 11 for rotary movement about a transverse axis within the header 11 is the feed auger 17 including the spiral flights 18 and 19 for conveying materials inward toward the central drum portion 20 as the auger 17 is driven in the direction of the arrow in FIG. 3. Projecting radially from the central drum portion 20 are a plurality of axially, but spirally, spaced feed fingers 21, of conventional construction.

The cutting apparatus or knife assembly 10 basically includes an elongated transverse mounting frame 23, an elongated knife frame 24 of substantially corresponding length, and a plurality of knife bars 25 fixed to the knife frame 24.

The mounting frame 23 is preferably an elongated transverse bar of angle iron having a pair of opposite end walls 26 and an intermediate journal ear 27. The intermediate ear 27 and the end walls 26 have longitudinally aligned holes or openings, such as hole 28 in end wall (FIG. 5). The back wall 29 of the elongated mounting frame or bar 23 is fixed to the back wall 14 of the header 11 above the feed opening 13 by fastener means, such as bolts 30.

The knife frame 24 is also preferably an elongated transverse angle bar or iron having a bottom wall 31, a back wall 32 and end walls 33 which project rearward to form end journal ears 34. An intermediate ear 35 also projects from the rear wall 32 adjacent the intermediate journal ear 27 of the mounting frame 23. All of the rearward projecting ears 34 and 35 also have aligned holes 36 (FIG. 4) of the same diameter as the holes 28 for removably receiving an elongated journal rod 38. The journal rod 38, extending through the designed holes 28, 36 in the respective end walls 26 and 34 and the intermediate journal ears 27 and 35, permits free pivotal movement of the knife frame 24 about a transverse longitudinal axis relative to the mounting frame 23.

The rear end portions 39 of the knife bars 25 are rigidly fixed to the transverse knife frame 24, such as by welding to the back wall 32 and the bottom wall 31 of the angular knife frame 24, as disclosed in FIGS. 2, 4 and 5. The rear end portions 39 of the knife bars 25 are preferably bent at 40 so that the major portions of the knife bars 25 project downward and forward in substantially straight lines toward the central drum portion 20. The free ends of the knife bars 25 form cutting portions, such as the knife blades 41, disposed in the same vertical planes as the longitudinal axes of the respective knife bars 25. The cutting end portions or knife blades 41 may take other forms, if desired, so long as they are capable of cutting the vines, stalks or other vegetation which become wrapped about the central drum portion 20 and are fed to the knife bars 25 by the feed fingers 21.

In order to limit the downward pivotal movement of the knife bars 25 to an operative position in which the knife blades are very close to the outer surface of the central drum portion 20, without actually engaging the drum portion 20, a stop mechanism is provided in the form of a threaded stop pin or bolt 43 threadedly engaging a corresponding threaded opening in a horizontal flange 44 projecting outwardly from one end wall 33 of the knife frame 24, as best disclosed in FIGS. 3 and 5. The stop pin 43 is adapted to engage the top edge or ledge 45 of the corresponding end wall 26 of the mounting frame 23, as illustrated in FIG. 3 The stop pin 43 is threadedly adjusted in its flange 44 so that when it engages the top ledge 45, the bottom edge of the knife blade 41 will be at the desired spacing proximate to the outer surface of the central drum portion 20, as illustrated in FIG. 3. If a greater spacing is desired between the cutting end 41 and the drum portion 20, then the adjustment stop pin 43 is turned to move the flange 44 upward away from the top ledge 45.

In order to bias the knife bars 25 downward into operative position, and to hold the knife bars 25 in operative position during normal operation and cutting, a spring member 47 is provided in the form of a coil spring having one end connected by a hook 48 to the bottom of the mounting frame 23. The opposite end of the spring member 47 is connected to a release mechanism 49, which in turn is connected to a bracket 50 fixed to a transverse reinforcing bar 51 connected to the midportions of the knife bars 25. The release mechanism 49 may be in the form of a toggle mechanism including a handle lever 52 connected at one end by a pivot pin 53 to a plate 54 pivotally connected at its opposite end to the bracket 50. The intermediate portion of the lever handle is connected by a pivot pin 55 to the free legs of a stirrup bracket 56, the bight end of which is pivotally connected to the other end of the spring member 47. Thus, by lifting the lever handle 52, as illustrated in phantom in FIG. 3, the pivot pin 55 is raised above, and past dead center with the pivot pin 53, in order to release the tension in the spring member 47, and permit the knife bars 25 to be elevated to an inoperative position, if desired.

In order to hold the knife bars 25 in an elevated position, a locking mechanism is provided in the form of a reciprocable locking pin 58 slidable transversely in a bracket 59 and biased laterally outboard by the spring 60. After the knife bars 25 have been raised to an elevated inoperative position, such as illustrated in FIG. 5, where the pin 58 is above the ledge 45, the spring 60 will project the locking pin 58 laterally outboard over the ledge 45 to prevent the knife bars 25 from moving downward, until the pin 58 is manually retracted inboard to clear the ledge 45.

Normally, the locking mechanism will be employed after the release mechanism 49 has been shifted to its inoperative phantom position in FIG. 3, to relieve the tension in the spring member 47. However, even with the release mechanism 49 in its solid-line operative position in FIG. 3, a sufficient jolt or obstruction can force upward the knife bars 25 to their inoperative position, causing the automatic protraction of the latch pin 58 to its locking position. Thus, the knife bars 25 will be held in their elevated inoperative position, until the central drum portion 20 can be inspected and any obstacles removed.

The latch pin 20 is adapted to extend through a corresponding hole in its own bracket 59 and an aligned hole 61 of equal diameter in the end wall 33 of the knife frame 24 as best disclosed in FIG. 5. The coil spring 60 is retained between the end wall 33 and the adjacent locking bracket 59.

It is thus seen that a quite versatile cutting apparatus 10 has been designed for mounting behind the central drum portion 20 of the auger 17 in a combine header 11, which may be adjusted for varying auger sizes and positions, and still maximize the cutting efficiency of the apparatus 10. Moreover, the pivotal mounting of the knife bars 25 in the header 11 provides not only a fail-safe feature to protect the various elements of the cutting apparatus 10 and the auger 17 from damage, but also to permit the knife bars 25 to be readily shifted to an inoperative position for inspection and servicing of the central drum portion 20 of the auger 17.

What is claimed is:

1. In a combine header having an auger rotatable about a transverse axis and including a central drum portion having axially spaced feed fingers projecting radially therefrom and a feed opening behind the central drum portion for communication with the throat of a combine, a cutting apparatus comprising:
    (a) a mounting frame,
    (b) means supporting said mounting frame in operative position above and in fixed relation to said feed opening,
    (c) a knife frame,
    (d) journal means supporting said knife frame on said mounting frame in operative position for pivotal movement about a transverse axis,
    (e) a plurality of transversely spaced, elongated knife bars, each knife bar having a fixed end portion fixed to said knife frame, and an opposite free cutting end portion, (f) each of at least some of said knife bars lying between the radial planes of rotation of a pair of adjacent feed fingers, (g) each of said cutting end portions being co-linear with said knife bar, (h) a first stop element on said knife frame, (i) a second stop element on said mounting frame engageable with said first stop element to limit the pivotal movement of the cutting end portions of said knife bars toward the central drum portion of said auger drum to an operative position slightly spaced from the surface of said central drum portion for cutting vegetation carried around said central drum portion by said feed fingers, (j) adjustment means operably associated with one of said stop elements to vary the position of said one stop element relative to its corresponding frame so that when said stop elements are engaged, said operative position of said cutting end portions relative to the surface of said central drum portion is varied.

2. The invention according to claim 1 in which one of said stop elements is a ledge and the other of said stop elements is a stop pin, and said adjustment means comprises threads on said stop pin threadedly engaging said corresponding frame.

3. The invention according to claim 1 further comprising locking means cooperative between said knife frame and said mounting frame to hold said knife bars in a substantially raised, inoperative position above said central drum portion.

4. The invention according to claim 3 in which said locking means comprises a transversely reciprocable locking pin mounted on one of said knife frame or said mounting frame and a catch surface on the other of said knife frame or said mounting frame, for engaging said locking pin in said raised inoperative position.

5. The invention according to claim 1 further comprising spring means connecting said mounting frame to said knife bars for biasing said knife bars toward said central drum portion, in operative position.

6. The invention according to claim 5 in which said spring means comprises a spring member having one end connected to said mounting frame, and releasable means connecting the opposite end of said spring member to said knife bars, said releasable means being actuable in one position to maintain spring tension in said spring member to bais said knife bars into said operative position, and in another position to release the spring tension upon said knife bars and to permit said knife bars to be raised to an inoperative position.

7. The invention according to claim 6 further comprising locking means cooperative between said mounting frame and said knife frame for releasably locking said knife bars in said raised inoperative position.

* * * * *